United States Patent [19]
Scherf

[11] 3,779,378
[45] Dec. 18, 1973

[54] APPARATUS AND METHOD FOR LINEARIZING THE OUTPUT OF A NORMALLY NONLINEAR RADIO FREQUENCY THICKNESS GAUGE

[75] Inventor: Gerald F. Scherf, Holland, Ohio
[73] Assignee: Owens-Illinois, Inc., Toledo, Ohio
[22] Filed: Jan. 31, 1973
[21] Appl. No.: 328,453

[52] U.S. Cl............ 209/73, 209/111.5, 324/58.5 A, 250/83.3 R
[51] Int. Cl............................................. B07c 5/08
[58] Field of Search................ 209/73, 111.7, 111.6, 209/111.5; 324/58.5 A; 250/83.3

[56] References Cited
UNITED STATES PATENTS
3,708,064  1/1973  Schepler et al........................ 209/73
3,393,799  7/1968  Schmersal.............................. 209/73

Primary Examiner—Allen N. Knowles
Assistant Examiner—Gene A. Church
Attorney—Steve M. McLary et al.

[57] ABSTRACT

Apparatus and method for producing a linear voltage versus thickness output for a radio frequency glass thickness gauge. One type of thickness measuring device for glass containers uses the attenuation of a radio frequency signal as a measure of thickness. The thickness signal is a voltage which varies nonlinearly as a function of thickness. This invention is a circuit for linearizing the nonlinear thickness signal. The input resistance to an operational amplifier is varied as a function of the thickness signal voltage. This creates a variable gain for the operational amplifier and consequently results in the generation of a linear thickness versus voltage relationship. Zener diodes are used as nonlinear variable resistors in two different thickness ranges to give a nonlinear, variable, input resistance to the operational amplifier.

5 Claims, 3 Drawing Figures

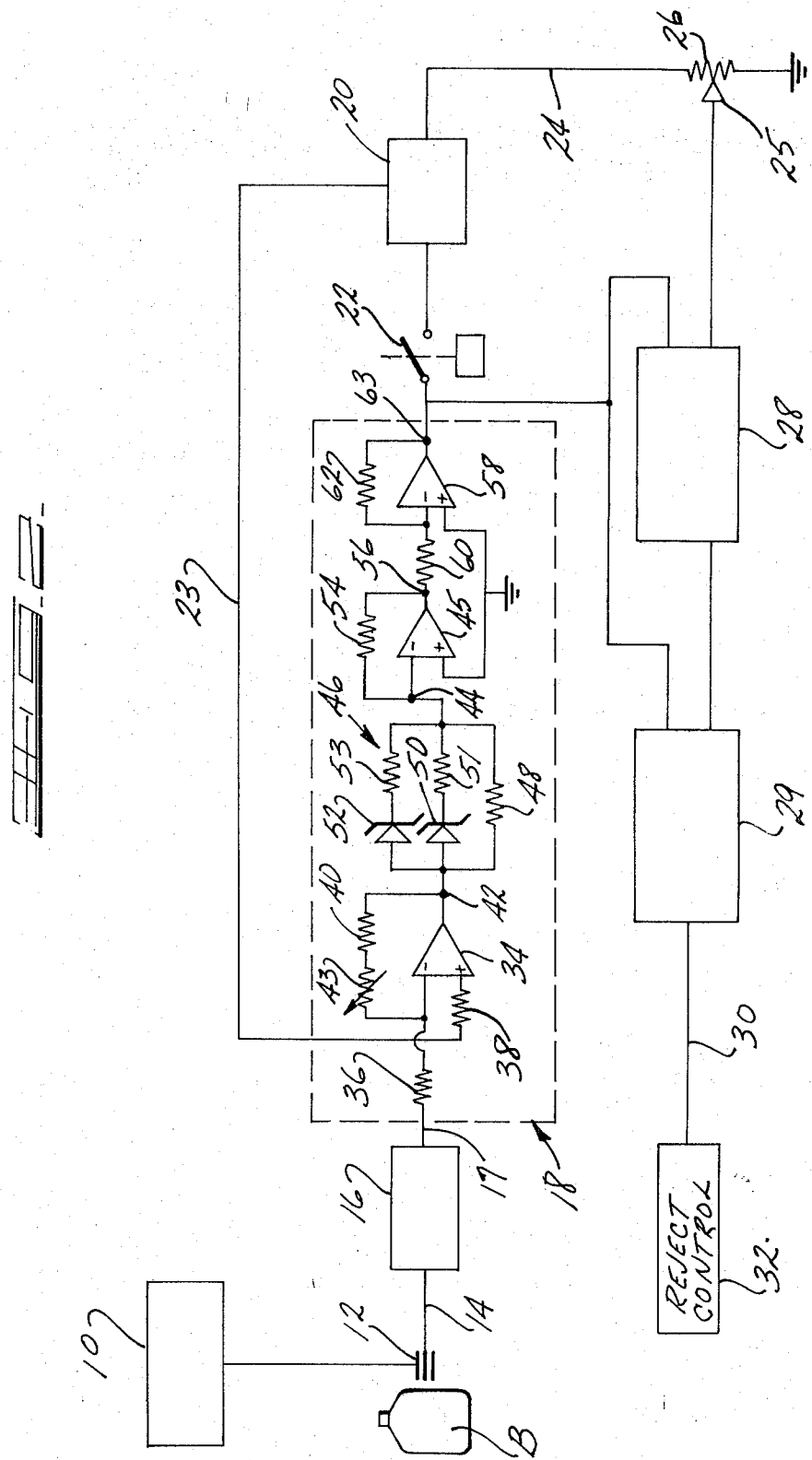

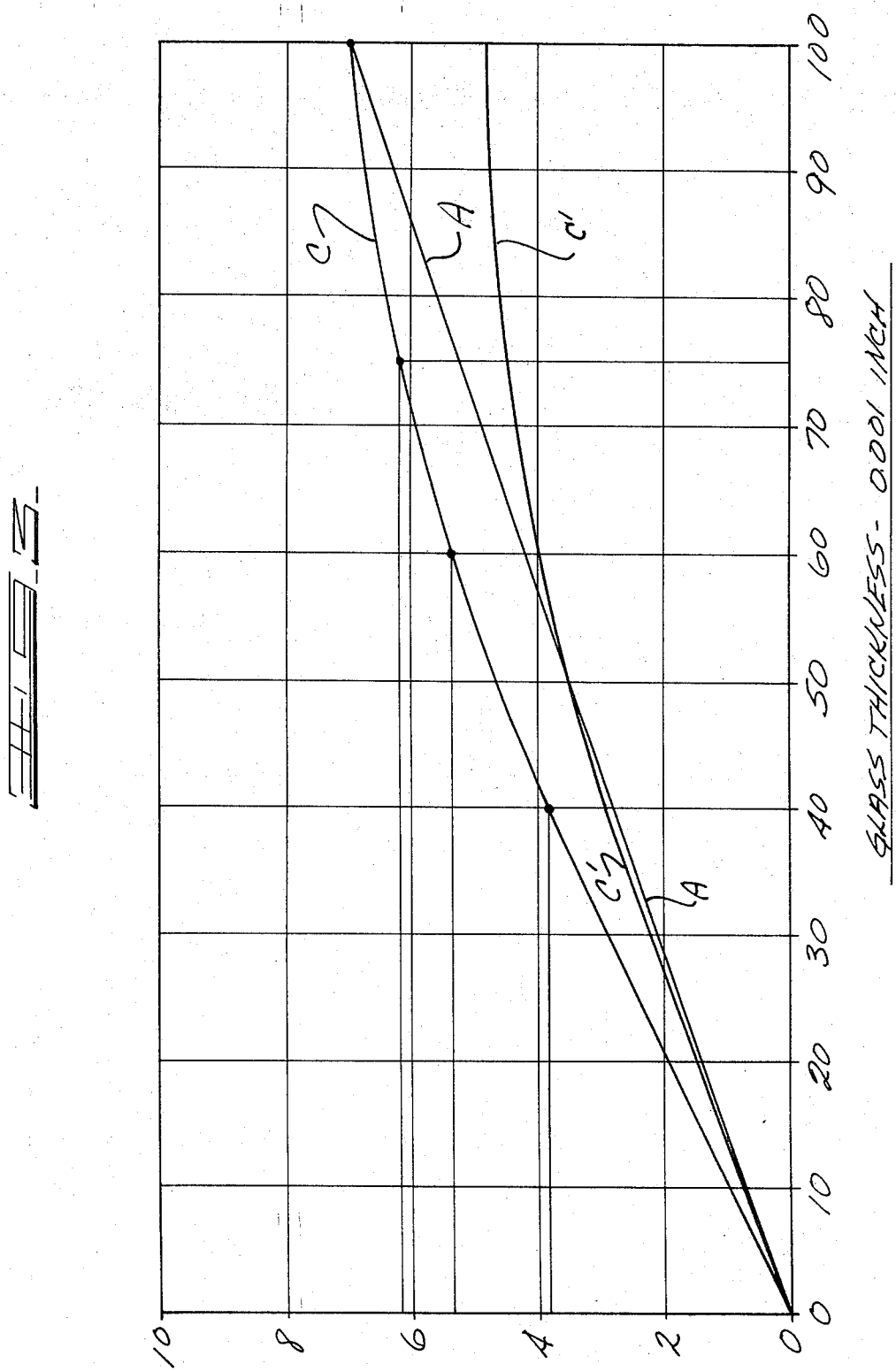

APPARATUS AND METHOD FOR LINEARIZING THE OUTPUT OF A NORMALLY NONLINEAR RADIO FREQUENCY THICKNESS GAUGE

BACKGROUND OF THE INVENTION

This invention generally relates to the inspection of glass containers. More specifically, this invention relates to the measurement of the thickness of the sidewalls of glass containers using radio frequency energy. Most particularly, this invention relates to a circuit for linearizing the nonlinear thickness versus voltage output curve of a radio frequency glass thickness gauge.

One type of radio frequency glass thickness gauge is disclosed in U.S. Pat. No. 3,708,064. The gauge disclosed therein has proven to be quite successful in gauging the thickness of glass containers on a commercial basis. However, this gauge has an output curve of thickness versus voltage which is nonlinear. This has led to problems in calibration of the gauge and in readily changing from one rejection level to another. My invention is a circuit which will generate a linear output curve of voltage versus thickness from the nonlinear voltage versus thickness output of the gauge in U.S. Pat. No. 3,708,064.

SUMMARY OF THE INVENTION

This invention is an improvement in an apparatus of the type which sorts articles made of a dielectric material according to their thickness by measuring the voltage attenuation of a radio frequency field passing through the article. In this apparatus, a nonlinear article thickness signal voltage is generated by subtracting a compensated reference signal, which is a measure of the field signal with no article present, from the signal received when an article is present. In the improvement, a first operational amplifier acts to subtract the compensated reference signal from the nonlinear signal received when an article is present. This gives a nonlinear voltage which is a measure of the article thickness. The thickness voltage is connected to a second operational amplifier through a circuit means for automatically varying the input resistance to the second operational amplifier as a function of the thickness voltage. The resistance value of the circuit means is always greater than the value of a feedback resistor connected between the input terminal of the second operational amplifier which receives the circuit means output and the output terminal of the second operational amplifier. The output of the second operational amplifier is connected to the input of a third operational amplifier. The output of the third operational amplifier is a linear voltage which is a measure of article thickness and is used in comparison with a minimum voltage level to make an accept or reject decision.

BRIEF DESCRIPTION OF THE DRAWINGS

FIG. 2 is a schematic circuit diagram of the apparatus of the present invention; and FIG. 3 is a chart identical to FIG. 1 further including a line representing the tipping of the actual nonlinear output line as required to calibrate the thickness gauge of the prior art.

DETAILED DESCRIPTION OF THE DRAWINGS

Figure 1:
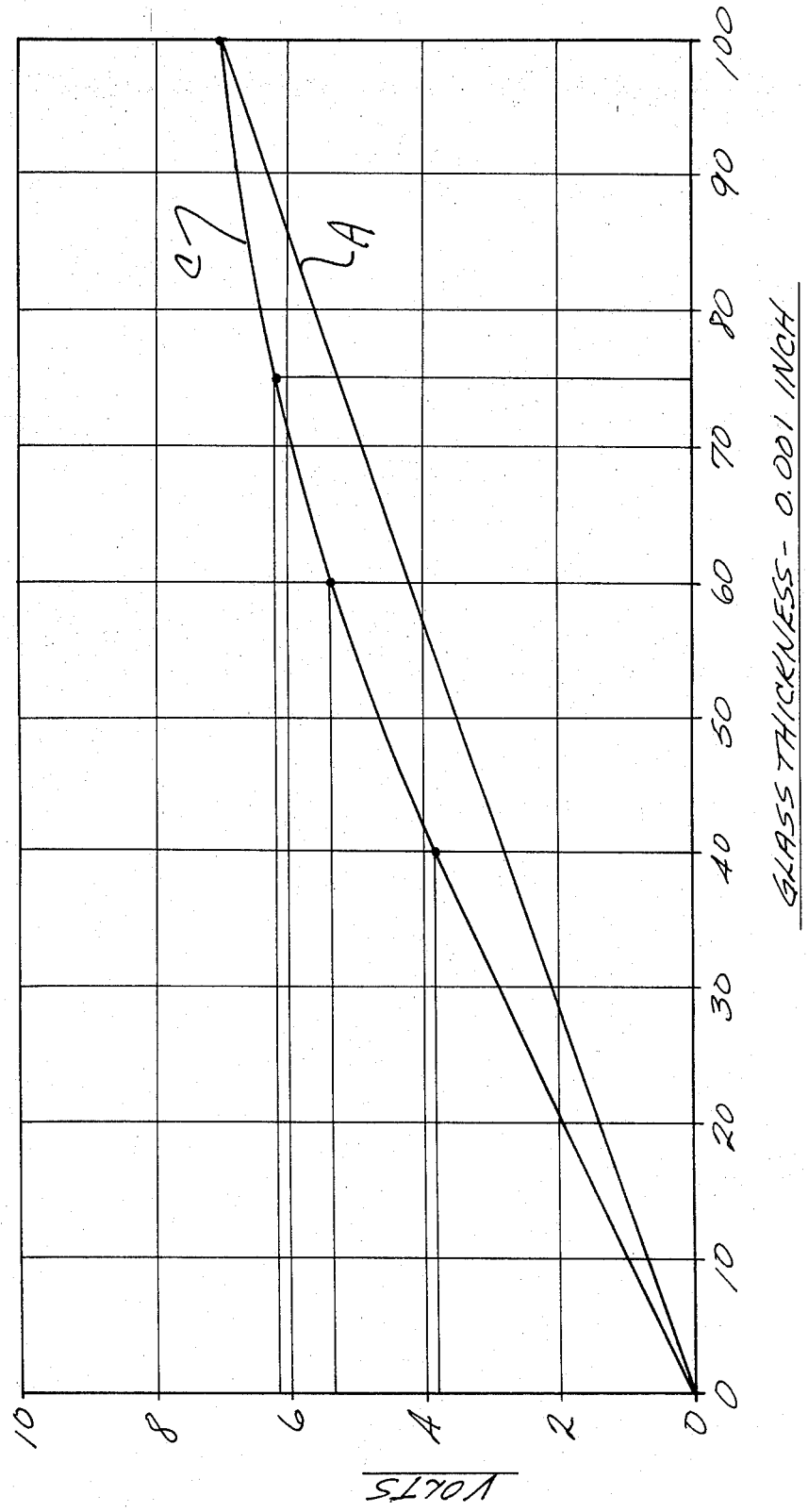
FIG. 1 is a chart of thickness versus voltage showing the desired linear output line and the actual nonlinear output line.

U.S. Pat. No. 3,708,064, the teachings of which are hereby incorporated by reference, discloses one type of apparatus for inspecting dielectric members. In particular, the patent which will hereinafter be referred to as the Schepler patent discloses a radio frequency gauge which may be used to measure the thickness of glass bottles. The gauge disclosed in the Schepler patent has met with widespread acceptance and is a useful and important tool in quality control of the manufacture of glass containers. While the output of this gauge was believed to be linear, operational experience showed the gauge output voltage to be nonlinear. This did not affect the ability of the Schepler gauge to function properly and prove itself as a valuable tool, but it did not allow for "in operation" changes in reject levels. That is, once the gauge has been calibrated for one particular thickness of glass as a defective or reject level, another thickness level for rejection may not be readily selected. It is necessary to completely recalibrate the entire gauge for the new thickness of glass before it can be operated in this new mode. It has, therefore, proven very difficult to change the level at which a container is considered defective during a production run. If it were desired to tighten production standards during a particular manufacturing run by rejecting containers of a thicker sidewall thickness than that originally chosen as a defective level, the gauge had to be removed from production while a recalibration for the new level was performed. The curves of FIG. 1 readily illustrate the situation presented by the existing Schepler patent. The gauge disclosed in the Schepler patent is designed such that a glass thickness of one-hundred thousandths of an inch is represented by a voltage of 7 volts. In theory, there should be a linear progression of voltage versus thickness from zero volts at zero thickness to 7 volts at one-hundred thousandths thickness. This theoretical line is represented by the curve A in FIG. 1. However, it has been found that the actual voltage versus thickness relationship is that shown by curve C in FIG. 1. It may be seen that the curve C deviates considerably from the curve A, particularly in the mid-range of thicknesses of from approximately thirty thousandths to eighty thousandths of an inch, while the curve C and the curve A are coincident at the maximum reading of one-hundred thousandths of an inch thickness and 7 volts output. It should be realized that the cutoff at one-hundred thousandths of an inch is a somewhat arbitrary figure, and is dictated by the realities of the commercial thickness of glass containers. It is most unusual to reject a glass container having a minimum sidewall thickness of as much as one-hundred thousandths of an inch as being too thin. In fact, the generally accepted range of minimum sidewall thicknesses for glass containers is in the range of from forth thousandths of an inch to eighty thousandths of an inch.

Referring now to FIG. 2, the entire system as a whole will first be described and then the details of the linearizing circuit will be explained. A high frequency signal is provided by a generator 10 connected to a conductive sleeve 12 which forms a radio frequency antenna. The high frequency signal may be on the order of 13,560,000 c.p.s. to establish a radio frequency field which extends outwardly from the front face of the antenna 12 into the region of the sidewall of a container B being gauged. This field will have a particular strength and shape, depending upon the dielectric of the material positioned in front of the antenna 12. When a container B is moved into an inspection station, the field will be distorted to a certain extent, the field strength will be changed, and the amplitude of the high frequency signal induced in a probe 14 will be changed, depending upon the thickness of the dielectric material in front of the antenna 12. Thus, the magnitude of the voltage induced in the probe 14, which is positioned coaxially within the antenna 12, varies substantially with the variations in thickness of the glass being gauged.

It should be understood at this point that the circuit shown in FIG. 2 is a circuit for a single channel of inspection. That is, the circuit shown in FIG. 2 will inspect substantially one vertical region of the container B around the circumference of the container B as the container B is rotated in front of the antenna 12. However, the circuit of FIG. 2 may be duplicated several times if it is desired to obtain measurements at a number of vertical locations throughout the height of the container B. In addition, as is conventional practice, the power supplies to the active elements within the circuits shown in FIG. 2 have been omitted for the sake of clarity. Those skilled in the art will readily recognize the necessity for such power supplies and their connection to such elements as require a power supply. Likewise, the recitation of specific operational voltage levels and signs therefor is simply given by way of illustration of one operation embodiment. These voltages and signs of the voltages should be taken by way of example only and not by way of limitation.

An amplifier 16 is connected to receive the output from the probe 14 and provides a direct current voltage output that is related by amplitude to the amplitude of the high frequency input received from the probe 14. The output of the amplifier 16 is connected to the input of an electronic means for generating a linear thickness signal 18 by suitable electrical wiring 17. The electronic means 18 is connected to the input of an integrating circuit 20 through a switch 22. As explained in the Schepler patent, the switch 22 is closed only during periods when the thickness of the container B is not being gauged, and the combination of the electronic means 18 and the integrating circuit 20 allows the generation of a reference voltage which indicates a glass thickness of zero. This reference voltage includes all the changes that may have occurred in the external machine-mounted components in the system or in the ambient effects that may change the level of voltages produced by the system, the ambient temperature, the relative humidity, the accumulation of dirt on the antenna 12 or the probes 14, or changes in the configuration of the probe 14 itself. When the system then processes a signal received when glass is present in front of the probe 14, the automatically compensated reference voltage may be used as a reference to be compared with the input voltage to enable the electronic means 18 to provide a thickness voltage which is a true linear measure of the thickness of the glass in front of the probe 14. In addition, the automatically compensated reference voltage is also utilized to provide or establish an automatically compensated reject reference voltage. The reference voltage appears from the integrating circuit 20 on electrical lines 23 and 24. A potentiometer 26 having a movable tap 25 is connected to the integrating circuit through the electrical wiring 24. Movement of the tap 25 enables selection of a reject level which corresponds to a minimum glass thickness which is acceptable; for example, forty thousandths of an inch. Since the voltage applied to the potentiometer 26 is automatically compensated, the reject reference voltage derived from the tap 25 will also be automatically compensated. Finally, two comparator circuits 28 and 29 act as a means for comparing the output of the electronic means 18 with the reject reference voltage to provide a reject signal when the thickness of the article is below a minimum acceptable thickness set by the magnitude of the reject reference voltage. This function is fully explained in the Schepler patent. If a defective container B is detected, an output from the second comparator circuit 29 appears on the electrical output line 30. This reject signal is directly connected to a reject control mechanism 32 which then discards the defective container B.

The first stage of the electronic means 18 is made up of a summing operational amplifier 34. The amplified signal from the probe 14 is connected through the wire 17 and a first input series resistor 36 to the negative input terminal of the operational amplifier 34. The compensated reference voltage is connected through the line 23 and a second input series resistor 38 to the positive input terminal of the operational amplifier 34. A fixed feedback resistor 40 is connected between an output terminal 42 of the operational amplifier 34 and the negative input terminal of the operational amplifier 34. A variable resistor 43 is connected in series with the fixed feedback resistor 40. The variable resistor 43 is used for calibration purposes as will be explained later. The output of the operational amplifier 34, as seen at the output terminal 42, will be the sum of the compensated reference voltage and the voltage as sensed by the probe 14. This voltage will then be a true measure of the thickness of a container B in front of the probe 14 and will generally follow the curve designated as C in FIG. 1. This is the nonlinear output thickness index used as the basic operational voltage in the Schepler system. The output terminal 42 of the operational amplifier 34 is connected to a negative input terminal 44 of a second operational amplifier 45. The second operational amplifier 45 is used as a voltage reducer or scaler to reduce the magnitude of the curve C voltage to reach that the ideal curve A in FIG. 1. It is desired to modify the nonlinear output voltage represented by the curve C to coincide with the slope of a pre-selected linear voltage versus thickness relationship as represented by the curve A. Connected in series between the output terminal 42 and input terminal 44 is a circuit means 46 for automatically varying the input resistance to the second operational amplifier 45 as a function of the output voltage of the first operational amplifier 34. The circuit means 46 is made up of three parallel legs, which are then connected in series between the terminals 42 and 44. One leg contains a single fixed resistor 48. Connected in parallel with the first fixed resistor 48 is a first Zener diode 50. A second fixed resistor 51 is connected in series with the first Zener diode 50. Connected in parallel with the first Zener diode 50 is a second Zener diode 52. A third fixed resistor 53 is connected in series with the second Zener diode 52. To fully understand the functioning of the circuit means 46, it will be necessary to keep in mind the two curves A and C, previously described with respect to FIG. 1. It will be noted that the curve C is substantially linear from a glass thickness of approximately zero to a glass thickness of approximately forty thousandths of an inch. However, the curve C is substantially displaced above the ideal curve A, which is the desired output of the circuit means 18. Thus, the second operational amplifier 45 is actually constructed to act as a voltage reducer rather than a voltage amplifier. The factor by which all of the voltages representing glass thickness between zero and forty thousandths of an inch need to be reduced is approximately 1.4. Thus, the fixed resistor 48 is designed to provide a fixed resistance input to the second operational amplifier 45 from the range of approximately zero glass thickness to forty thousandths of an inch glass thickness. A fixed feedback resistor 54 is connected between the input terminal 44 of the second operational amplifier 45 and the output terminal 56 of the operational amplifier 45. The combination of the feedback resistor 54 and the fixed input resistor 45, as is well known in the art, determines the overall gain through the second operational amplifier 45. If the input resistance is greater than the feedback resistance, then the operational amplifier will act as a voltage reducer. This is precisely the situation in this case. The fixed resistor 48 has a greater resistance value than the feedback resistor 54. Thus, from the thickness range of zero to approximately forty thousandths of an inch, the voltage output from the first operational amplifier 34, which is a measure of the thickness of a glass container B, is reduced by a consistent factor of approximately 1.4, which makes the output of the second operational amplifier 45 a voltage which falls along the ideal curve A. A thickness level of approximately forty thousandths of an inch corresponds to a voltage output from the first operational amplifier 34 of approximately 3.9 volts. So long as the voltage is below 3.9 volts, the two Zener diodes 50 and 52 will be off. It is well known that Zener diodes are devices which will remain off so long as their threshold voltage level is not exceeded, and when their voltage threshold level is exceeded, they will turn on or allow conduction through themselves and eventually reach a state at which they will maintain a constant voltage across themselves. It is recognized, of course, that by maintaining a constant voltage across the Zener diode, a constant resistance is likewise maintained. It is equally well known that any particular Zener diode will display a family of characteristic curves depending on the input current to the Zener diode. In this particular case, the two Zener diodes 50 and 52 have been chosen such that their characteristic curves, at least the initial knee portion of the characteristic curves, is the inverse of specific regions of the nonlinear voltage thickness curve C. As the 3.9 volt level is exceeded, that is, as the glass becomes thicker, the Zener diode 50 will begin to conduct. During the initial stages of conduction, the resistance of the Zener diode 50 will be varying in a nonlinear fashion. In this particular case, the nonlinear variation of the Zener diode 50 during the initial conduction period has been chosen such that it is substantially the inverse of that portion of the curve C lying between forty thousandths of an inch and sixty thousandths of an inch or, viewing the curve in terms of voltages, between approximately 3.9 volts and 5.4 volts. At 5.4 volts, the Zener diode 50 will be fully conducting and will exhibit no further change in its resistance characteristics. However, so long as the voltage is between the 3.9 and 5.4 level, the resistance of the Zener diode 50 will be changing in a nonlinear fashion, thereby changing the net effective input to the second operational amplifier 45 in a nonlinear fashion, thereby bringing the curve C down to meet the ideal curve A within this particular region. The fixed resistor 51 in series with the Zener diode 50 is used to limit the current into the Zener diode 50 to that value which will produce a characteristic curve of the Zener diode 50 which will precisely match or, more correctly, will precisely provide the inverse of that portion of the curve C between forty thousandths of an inch and sixty thousandths of an inch glass thickness. Thus, at sixty thousandths of an inch glass thickness, the effective input resistance to the second operational amplifier 45 will be the resultant value of the parallel combination of the first fixed resistor 48, the second fixed resistor 51 and the now fixed resistance across the Zener diode 50. However, this, of course, is a correct situation, since at sixty thousandths of an inch, the voltage produced at the output terminal 42 of the first operational amplifier 34 may be corrected downward by a fixed amount to bring it from the actual curve C to the ideal curve A. The second Zener diode 52 is nonconductive until a value of approximately 5.4 volts is reached. It should be realized that the actual turn-on voltages of the Zener diodes 50 and 52 overlap somewhat in operation, but this is not a critical factor and may be safely ignored for the purposes of a theoretical explanation of the operation of this circuit. At approximately 5.4 volts, the Zener diode 52 will begin to conduct. As was the case with the Zener diode 50, the Zener diode 52 will change its effective resistance in a nonlinear fashion between the voltage levels of approximately 5.4 volts and 6.1 volts, which corresponds to glass thicknesses of from approximately sixty thousandths of an inch to approximately seventy-five thousandths of an inch. This again will non-linearly adjust the input resistance to the second operational amplifier 45 to once again bring the values from the curve C down to the ideal curve A, thus presenting a linear output from the second operational amplifier 45. The third fixed resistor 53 is once again used as a current limiting resistor for the second Zener diode 52 in order to provide the precise curve of the Zener diode 52 which will act as an inverse to the curve C in the specified range to bring the curve C down to the ideal curve A. Thus, at seventy-five thousandths of an inch glass thickness or a voltage level of approximately 6.1 volts output from the first operational amplifier 34, the Zener diode 50 will be fully conducting. Thus, the net effective input resistance to the second operational amplifier 45 will be the resultant value of the parallel combination of the first fixed resistor 48, the second fixed resistor 51 and the now fixed resistance of the Zener diode 50 and the third fixed resistor 53 and the likewise now fixed resistance of the second Zener diode 52.

It may be recalled that it was mentioned initially that the normal operational limit of this device is a glass thickness of one-hundred thousandths of an inch corresponding to an output voltage of approximately 7 volts. However, for practical commercial use, the system as shown here has been configured to measure a glass wall thickness no greater than seventy-five thousandths of an inch. Commercial considerations are such that it is exceedingly unlikely that it would be necessary to reject any glass container which had a glass wall thickness greater than seventy-five thousandths of an inch. However, those skilled in the art will readily recognize that the rest of the range from seventy-five thousandths to one-hundred thousandths of an inch may be readily linearized or brought from the curve C to the curve A by the addition of further parallel Zener diode and fixed resistance combinations. In addition, the second Zener diode 52 and third fixed resistor 53 may, in some instances, likewise be omitted. Again, considering actual commercial conditions, sixty thousandths of an inch actual glass thickness may be considered to be a sufficient upper limit for proper operation of this gauge. Thus, the second Zener diode 52 and the third fixed resistor 53 may properly be considered to be auxiliary or optional features which may or may not be used, depending on the particular considerations of the installation in which a radio frequency thickness gauge of this type is used. Having gone through the second operational amplifier 45, the actual thickness signal emerges from the output terminal 56 of the second operational amplifier 45 as a substantially linear signal which will follow the ideal curve A as shown in FIG. 1. The passage through the second operational amplifier 45 has created an inversion in the voltage signal sign which must be corrected, since the rest of the circuit is substantially identical to that disclosed in the Schepler patent, and thus would operate on a voltage sign identical to that emerging from the first operational amplifier 34. Thus, a third operational amplifier 58 is provided as a simple inverting amplifier. The thickness signal is transmitted from the output terminal 56 through a fixed input resistor 60 to the negative input terminal of the operational amplifier 58. A fixed feedback resistor 62 is connected between the negative input terminal of the operational amplifier 58 and the output terminal 63 of the operational amplifier 58. The values of the resistors 60 and 62 are identical, so that there is unity gain through the operational amplifier 58, and it simply acts as an inverting operational amplifier to obtain the proper voltage sense or sign of the signal, which then is transmitted to the two comparator circuits 28 and 29 for further signal processing. The positive input terminals of both operational amplifiers 45 and 58 are connected to ground.

Calibration of the device thus described is a simple process which need be done only once during the initial setup of the device, and glass containers B of varying wall thicknesses may be sorted for different minimum wall thicknesses by simply adjusting the setting of the tap 25 of the potentiometer 26. The setup procedure basically consists of the following steps. The potentiometer 26 may typically be a 10-turn type, such that each turn corresponds to ten-thousandths of an inch glass thickness. Thus, the potentiometer 26 is adjusted such that the tap 25 reads a particular desired thickness level at which a container B will be rejected. Usually in this calibration procedure, a glass microscope slide of a known thickness, rather than a glass container B, is used for simplicity's sake. The microscope slide, whose thickness is known, is placed in front of the probe 14 such that a voltage is induced in the probe 14 representative of the thickness of the microscope slide. The potentiometer 26 has been set at a level corresponding to the known thickness of the microscope slide. Then, the variable resistor 43 in the feedback loop around the first operational amplifier 34 is adjusted until the output voltage sensed at the output terminal 63 of the third operational amplifier 58 is equivalent to the voltage sensed by the tap 25 of the potentiometer 26. This procedure may be carried out by a voltage meter connected to read the output voltage of the operational amplifier 58, or may be carried out by a meter built into the circuit which is activated only during the calibration period. With the machine thus calibrated, the tap 25 of the potentiometer 26 may be moved at will to a different thickness at which rejection is desired, and the gauge will respond in a proper manner. This procedure must be contrasted with that which had to be followed with the Schepler teachings. It must be kept in mind that the procedure just described assumes that the output voltage of the third operational amplifier 58 follows the ideal line A shown in FIG. 1, which it will, as has been previously explained. The output voltage of the Schepler device followed the curve C shown in FIG. 1 and was the voltage present at the output terminal 42 of the first operational amplifier 34. In that case, assume that the rejection level desired was fifty thousandths of an inch. In that case, it was first necessary to find a sample which was fifty thousandths of an inch thick. This was then positioned in front of the probe 14, and the potentiometer 26 was set to a level of fifty thousandths of an inch. Then, the variable resistor 43 could be adjusted until the voltage output at the terminal 42 was equivalent to the rejection voltage set on the potentiometer 26. However, adjustment of the variable resistor 43, in effect, tipped the curve C until it intersected the curve A at the point set on the potentiometer 26. This was the case, since the potentiometer 26 is a substantially linear device, and setting the potentiometer 26 assumes that the curve A is the output curve followed by the thickness voltage. This is best illustrated in FIG. 3, where the output curve C is shown tipped as a curve C' until it intersects at the actual voltage required for rejection at fifty thousandths of an inch. It can be readily seen that the curve C' created by the adjustment of the variable resistor 43 corresponds with the ideal curve A only within a very narrow band of glass thicknesses, between approximately forty-six thousandths of an inch and fifty-four thousandths of an inch. At glass thicknesses outside this very narrow band, the curve C' and the curve A do not correspond. Thus, if one were to attempt to reset the reject level, which is controlled by the setting of the potentiometer 26, to a value of, for example, seventy thousandths of an inch, the voltage at which a container would be rejected is that controlled by the ideal curve A which is the line followed by the potentiometer 26. Thus, at seventy thousandths of an inch, the reject voltage level would be approximately 4.9 volts, as determined by the potentiometer 26 and the ideal line A. However, at seventy thousandths of an inch, it may be seen that the tilted or compensated curve C' will actually produce a voltage of only about 4 volts. The curve C' never rises as high as 4.9 volts in this example and thus, the gauge would reject every container presented to it as being below seventy thousandths in minimum thickness, since the thickness voltage level never rises to the point which indicates that a container is as thick as seventy thousandths of an inch. In the situation of the linearized thickness output voltage, provided by the circuit of the present invention, adjustment of the potentiometer 43 merely moves an output voltage from the third operational amplifier 58, which is linear, to coincide with the ideal line A. That is, before calibration, the actual output of the third operational amplifier 58 is a linear voltage which could be displaced slightly to one side or the other of the theoretical voltage level A. Adjustment of the variable resistor 43 will then pivot this linear output about its zero point, until it coincides with the theoretical voltage output line A. This is, in a sense, an adjustment of the slope of the linear output of the third operational amplifier 58 to coincide with the slope of the theoretical output voltage curve A.

What I claim is:

1. In an apparatus for measuring the thickness of an article formed from a dielectric material, wherein an antenna is used to establish a radio frequency field outwardly in the direction of an article positioned adjacent thereto; a probe is positioned in said field adjacent to said article; the voltage induced in said probe is a nonlinear index of the thickness of that portion of said article immediately in front of said probe; a compensated reference voltage is generated during periods when no article is present and held as a constant voltage during periods when an article is present; said induced voltage and said compensated reference voltage are summed to provide an output signal voltage which is a nonlinear voltage measure of the thickness of said article; said nonlinear thickness voltage is compared with a pre-selected minimum voltage level to provide a reject signal when the thickness of said article is below a pre-selected value represented by said pre-selected minimum voltage level; and said reject signal is transmitted to a reject control mechanism for rejecting articles exhibiting a thickness voltage below said pre-selected minimum voltage level, the improvement in said apparatus which comprises, in combination:

a first operational amplifier having at least two input terminals and one output terminal;

a first input resistor connected in series with said probe and with a first input terminal of said first operational amplifier;

a second input resistor connected in series with said compensated reference voltage and with a second input terminal of said first operational amplifier;

a fixed feedback resistor connected between the output terminal of said first operational amplifier and said first input terminal of said first operational amplifier;

a variable feedback resistor connected in series with said fixed feedback resistor for said first operational amplifier;

a second operational amplifier having at least two input terminals and one output terminal;

a fixed feedback resistor connected between a first input terminal of said second operational amplifier and the output terminal of said second operational amplifier;

circuit means, connected in series between the output terminal of said first operational amplifier and said first input terminal of said second operational amplifier, for automatically varying the input resistance to said second operational amplifier as a function of the output voltage of said first operational amplifier, the minimum resistance of said circuit means being greater than the resistance value of said fixed feedback resistor for said second operational amplifier;

a third operational amplifier having at least two input terminals and one output terminal;

a fixed feedback resistor connected between the output terminal of said third operational amplifier and said first input terminal of said third operational amplifier, the resistance values of said input and feedback resistors for said third operational amplifier being substantially equal, whereby the output voltage from said third operational amplifier is a linear voltage measure of the thickness of said article and is connected to allow comparison of said linear voltage with said pre-selected minimum voltage level.

2. The apparatus of claim 1, wherein said circuit means comprises, in combination:

a first fixed resistor, for reducing, in combination with said second operational amplifier feedback resistor, the gain of said second operational amplifier by a fixed amount in a first pre-selected range of article thicknesses;

a first Zener diode biased to be off so long as said article thickness, as indicated by said induced voltage in said probe, is within said first pre-selected range of thicknesses and to be on when said thickness is within a second pre-selected range of article thicknesses having a minimum value substantially equal to the maximum value of said first pre-selected range of thicknesses and connected in parallel with said first fixed resistor; and a second fixed resistor, connected in series with said first Zener diode, for limiting the current to said first Zener diode to a pre-selected amount to force the voltage across said Zener diode to vary nonlinearly, in said second pre-selected range of article thicknesses, in approximately inverse relationship to the voltage variation of said voltage induced in said probe, the voltage across said Zener diode being fixed when the maximum value of said second range of thicknesses is reached.

3. The apparatus of claim 2, further including:

a second Zener diode, connected in parallel with said first Zener diode, biased to be off so long as said article thickness, as indicated by said induced voltage in said probe, is within a third pre-selected range of article thicknesses having a minimum value substantially equal to the maximum value of said second range of thicknesses and to be on when said thicknesses is within said third range of article thicknesses; and a third fixed resistor, connected in series with said second Zener diode, for limiting the current to said second Zener diode to a pre-selected amount to force the voltage across said Zener diode to vary non-linearly, in said third range of article thicknesses, in approximately inverse relationship to the voltage variation of said voltage induced in said probe, the voltage across said Zener diode being fixed when the maximum value of said third range of thicknesses is reached.

4. In a method for inspecting dielectric articles wherein a radio-frequency field is provided at an inspection station; an attenuated signal of said field is detected as an index of the thickness of an article placed in said field; a compensated reference signal is generated during periods when no article is present in said inspection station and held as a constant value when articles are present in said inspection station; and said attenuated signal and said compensated reference signal are summed to give a nonlinear output signal which is a measure of the thickness of said article, the improvement in said method which comprises the steps of:

a. electronically decreasing said output signal, in a first range of thicknesses of said articles, by a fixed amount to generate a linear voltage versus thickness relationship having a pre-selected slope; and b. electronically decreasing said output signal, in a second range of thicknesses of said articles having a minimum value substantially equal to the maximum value of said first thickness range, by a variable amount as a function of said output signal to coincide with said slope of said linear voltage versus thickness relationship in said second range of thicknesses of said articles as well as in said first range of thicknesses.

5. The method of claim 4, further including the step of:

c. electronically decreasing said output signal, in a third range of thicknesses of said articles having a minimum value substantially equal to the maximum value of said second thickness range, by a variable amount as a function of said output signal to coincide with said slope of said linear voltage versus thickness relationship in said third range of thicknesses as well as in said first and second range of thicknesses.

* * * * *